US008474694B2

(12) United States Patent
Chakiris et al.

(10) Patent No.: US 8,474,694 B2
(45) Date of Patent: Jul. 2, 2013

(54) RADIO FREQUENCY IDENTIFICATION PURCHASE TRANSACTIONS

(75) Inventors: Phil M Chakiris, Atlanta, GA (US); Merrill Brooks Smith, Ft. Lauderdale, FL (US); Leslie G Lowin, West Sussex (GB)

(73) Assignee: e2interactive, Inc., Atlanta, GA (US)

( * ) Notice: Subject to any disclaimer, the term of this patent is extended or adjusted under 35 U.S.C. 154(b) by 854 days.

(21) Appl. No.: 12/417,317

(22) Filed: Apr. 2, 2009

(65) Prior Publication Data

US 2009/0194583 A1 Aug. 6, 2009

Related U.S. Application Data

(63) Continuation-in-part of application No. 11/436,321, filed on May 18, 2006, now abandoned, which is a continuation-in-part of application No. 11/233,704, filed on Sep. 23, 2005, now Pat. No. 7,472,822.

(60) Provisional application No. 60/664,188, filed on Mar. 23, 2005.

(51) Int. Cl.
*G07F 19/00* (2006.01)

(52) U.S. Cl.
USPC .......................................... 235/379; 235/375

(58) Field of Classification Search
USPC ................... 235/497, 380, 375, 379
See application file for complete search history.

(56) References Cited

U.S. PATENT DOCUMENTS

| | | | |
|---|---|---|---|
| 4,068,213 A | 1/1978 | Nakamura | |
| 4,482,802 A | 11/1984 | Aizawa | |
| 4,755,940 A | 7/1988 | Brachtl | |
| 4,877,947 A | 10/1989 | Mori | |
| 5,255,182 A | 10/1993 | Adams | |
| 5,384,449 A | 1/1995 | Peirce | |
| 5,477,038 A | 12/1995 | Levine | |
| 5,577,109 A | 11/1996 | Stimson | |
| 5,621,201 A | 4/1997 | Langhans | |
| 5,760,381 A | 6/1998 | Stich | |
| 5,806,045 A | 9/1998 | Biorge | |
| 5,991,748 A | 11/1999 | Taskett | |
| 6,000,608 A | 12/1999 | Dorf | |
| 6,018,570 A | 1/2000 | Matison | |
| 6,018,717 A | 1/2000 | Lee | |
| 6,047,270 A | 4/2000 | Joao | |
| 6,129,275 A | 10/2000 | Urquhart | |
| 6,129,276 A | 10/2000 | Jelen | |
| 6,167,387 A | 12/2000 | Lee-Wai-Yin | |
| 6,169,975 B1 | 1/2001 | White | |
| 6,173,272 B1 | 1/2001 | Thomas | |

(Continued)

*Primary Examiner* — Karl D. Frech

(74) *Attorney, Agent, or Firm* — Landmark Intellectual Property Law, PC

(57) ABSTRACT

Methods and systems for using a Radio Frequency Identification (RFID) payment card are disclosed herein. The method generally comprises receiving an indicia identifying an RFID card, receiving a request to activate the RFID card, activating the RFID card by associating an initial value with a database record associated with the RFID card; receiving a PIN associated with the RFID card; receiving profile information; and associating the profile information with the database record. Systems for using RFID cards generally comprise an RFID card, an RFID account associated with the RFID card, a merchant communication module that receives indicia identifying the RFID card and sends a request to activate the RFID card, and a central processor or intermediary that receives a PIN associated with the RFID card and a request to activate the RFID card from the merchant communication module.

27 Claims, 6 Drawing Sheets

U.S. PATENT DOCUMENTS

| | | |
|---|---|---|
| 6,185,545 B1 | 2/2001 | Resnick |
| 6,189,787 B1 | 2/2001 | Dorf |
| 6,199,757 B1 * | 3/2001 | Kubert .......................... 235/380 |
| 6,202,933 B1 | 3/2001 | Poore |
| 6,208,851 B1 | 3/2001 | Hanson |
| 6,237,023 B1 | 5/2001 | Yoshimoto |
| 6,270,012 B1 | 8/2001 | Dawson |
| 6,298,336 B1 | 10/2001 | Davis |
| 6,315,195 B1 | 11/2001 | Ramachandran |
| 6,328,341 B2 | 12/2001 | Klure |
| 6,375,073 B1 | 4/2002 | Aebi |
| 6,434,238 B1 | 8/2002 | Chaum |
| 6,450,407 B1 | 9/2002 | Freeman |
| 6,473,500 B1 | 10/2002 | Risafi |
| 6,529,593 B2 | 3/2003 | Nelson |
| 6,575,361 B1 | 6/2003 | Graves |
| 6,625,438 B2 | 9/2003 | Hanson |
| 6,648,222 B2 | 11/2003 | McDonald |
| 6,837,426 B2 | 1/2005 | Tidball |
| 6,918,537 B2 | 7/2005 | Graves |
| 6,961,412 B2 | 11/2005 | Ruckart |
| 7,024,174 B2 | 4/2006 | Nagy |
| 7,072,864 B2 * | 7/2006 | Brake et al. ..................... 705/41 |
| 7,093,761 B2 | 8/2006 | Smith |
| 7,131,582 B2 | 11/2006 | Welton |
| 7,194,438 B2 * | 3/2007 | Sovio et al. ..................... 705/50 |
| 7,209,890 B1 | 4/2007 | Peon |
| 7,292,998 B2 | 11/2007 | Graves |
| 7,328,190 B2 | 2/2008 | Smith |
| 7,333,955 B2 | 2/2008 | Graves |
| 7,370,012 B2 | 5/2008 | Karns |
| 7,376,583 B1 | 5/2008 | Rolf |
| 7,398,248 B2 | 7/2008 | Phillips |
| 7,483,862 B1 | 1/2009 | Robinson |
| 2001/0000808 A1 | 5/2001 | Lesley |
| 2001/0001321 A1 | 5/2001 | Resnick |
| 2002/0022966 A1 | 2/2002 | Horgan |
| 2002/0025797 A1 | 2/2002 | Joao |
| 2003/0001005 A1 | 1/2003 | Risafi |
| 2003/0014360 A1 | 1/2003 | Arditti |
| 2003/0028481 A1 | 2/2003 | Flitcroft |
| 2003/0033246 A1 | 2/2003 | Slater |
| 2003/0038175 A1 | 2/2003 | Welton |
| 2003/0055782 A1 | 3/2003 | Slater |
| 2003/0061113 A1 | 3/2003 | Petrovich |
| 2003/0061157 A1 | 3/2003 | Hirka |
| 2003/0070080 A1 | 4/2003 | Rosen |
| 2003/0078835 A1 | 4/2003 | Pluchinske |
| 2003/0105672 A1 | 6/2003 | Epstein |
| 2003/0135462 A1 | 7/2003 | Brake |
| 2003/0144909 A1 | 7/2003 | Flaherty |
| 2003/0144935 A1 | 7/2003 | Sobek |
| 2003/0172031 A1 | 9/2003 | Graves |
| 2003/0194988 A1 | 10/2003 | Knox |
| 2003/0204441 A1 | 10/2003 | Ellis |
| 2003/0204457 A1 | 10/2003 | Arias |
| 2003/0218062 A1 | 11/2003 | Noriega |
| 2004/0007618 A1 | 1/2004 | Oram |
| 2004/0039702 A1 | 2/2004 | Blair |
| 2004/0064412 A1 | 4/2004 | Phillips |
| 2004/0118914 A1 | 6/2004 | Smith |
| 2004/0133511 A1 | 7/2004 | Smith |
| 2004/0153402 A1 | 8/2004 | Smith |
| 2004/0167821 A1 | 8/2004 | Baumgartner |
| 2004/0181453 A1 | 9/2004 | Ray |
| 2004/0205023 A1 | 10/2004 | Hafer |
| 2004/0210449 A1 | 10/2004 | Breck |
| 2004/0210519 A1 | 10/2004 | Oppenlander |
| 2004/0215573 A1 | 10/2004 | Teutenberg |
| 2004/0218741 A1 | 11/2004 | Welton |
| 2004/0230489 A1 | 11/2004 | Goldthwaite |
| 2004/0230536 A1 | 11/2004 | Fung |
| 2004/0267663 A1 | 12/2004 | Karns |
| 2005/0001027 A1 | 1/2005 | Bahar |
| 2005/0027655 A1 | 2/2005 | Sharma |
| 2005/0033645 A1 | 2/2005 | Duphily |
| 2005/0051619 A1 | 3/2005 | Graves |
| 2005/0061872 A1 | 3/2005 | Paschini |
| 2005/0086171 A1 | 4/2005 | Abe |
| 2005/0127169 A1 | 6/2005 | Foss |
| 2005/0143051 A1 | 6/2005 | Park |
| 2005/0149387 A1 | 7/2005 | O'Shea |
| 2005/0182720 A1 | 8/2005 | Willard |
| 2005/0228717 A1 | 10/2005 | Gusler |
| 2005/0234820 A1 | 10/2005 | MacKouse |
| 2005/0240473 A1 | 10/2005 | Ayers |
| 2005/0263587 A1 | 12/2005 | Martinez |
| 2005/0278216 A1 | 12/2005 | Graves |
| 2006/0023856 A1 | 2/2006 | Welton |
| 2006/0026073 A1 | 2/2006 | Kenny |
| 2006/0085335 A1 | 4/2006 | Crawford |
| 2006/0100927 A1 | 5/2006 | Zormati |
| 2006/0161490 A1 | 7/2006 | Chakiris |
| 2006/0213985 A1 | 9/2006 | Walker |
| 2006/0218097 A1 | 9/2006 | Walker |
| 2006/0249570 A1 | 11/2006 | Seifert |
| 2006/0255135 A1 | 11/2006 | Smith |
| 2006/0289621 A1 | 12/2006 | Foss |
| 2007/0057045 A1 | 3/2007 | Beck |
| 2007/0118478 A1 | 5/2007 | Graves |
| 2008/0041938 A1 | 2/2008 | Wise |
| 2008/0109356 A1 | 5/2008 | Sutton |
| 2010/0176948 A1 * | 7/2010 | Garrett et al. .............. 340/572.1 |
| 2011/0270693 A1 * | 11/2011 | Paschini et al. ................. 705/16 |

* cited by examiner

RADIO FREQUENCY IDENTIFICATION PURCHASE TRANSACTIONS

CROSS-REFERENCE TO RELATED APPLICATION

The present application is a continuation of U.S. Continuation-in-Part patent application Ser. No. 11/436,321 filed May 18, 2006 now abandoned, which claims priority to U.S. patent application Ser. No. 11/233,704 filed Sep. 23, 2005, which in turn claims priority to Provisional Patent Application No. 60/664,188 filed on Mar. 23, 2005, all of which are incorporated herein by reference in their entirety.

BACKGROUND OF THE INVENTION

This invention is generally directed to the use of Radio Frequency Identification (RFID) in various purchase transactions. More specifically, the invention is directed to using RFID to enhance pre-payment of wireless airtime and other services.

A manner known in the art in which to pay for goods and/or services, is for the user to make payments to credit an account in advance. This type of payment is commonly known as "pre-pay." The process of making a payment and crediting the user's account is commonly known as a "top-up," which reflects the normal manner of usage in which the user frequently tops up their account by relatively small amounts. Many pre-pay systems allow the user to make payments at a variety of retail establishments, thereby allowing the user to pay for a top-up at a location which is convenient. In addition to wireless telecommunications, such pre-paid accounts are presently used for numerous other goods and services.

It is known in the art to add value to such pre-paid accounts through the use of stored value cards. The insertion of the stored value into a pre-paid account has several steps. First, the user purchases at a retail outlet a stored value card associated with a value. Upon purchase of the stored value card, the card may be activated. Such activation may be accomplished by the retailer or user providing information sufficient to identify the particular stored value card that the user is purchasing to a central processor. Often, this information is provided to a central processor by swiping a magnetic stripe on the stored value card, by scanning a bar code on the stored value card, or by entering account information located on the stored value card.

Second, the user accesses a central processor, e.g., by calling a toll-free number on the back of the card, and requests to add the value associated with the stored value card to the user's prepaid account. The user typically must provides information sufficient to identify the user's account, such as a phone number associated with the account and the name of the account provider. Once the proper authorization is received, and any necessary information is verified, the central processor may then cause the value associated with the stored value card to be added to the user's prepaid account. Several pieces of information must be provided during this transaction, including (1) the amount of payment; (2) confirmation of secure receipt of payment; (3) the number of the mobile phone to which the payment is to be applied; and (4) the wireless carrier with which the mobile phone number is associated.

Presently, this information is provided in a variety of different ways, such as via reading a magnetic stripe, reading a bar code (linear and two-dimensional), manual input, and/or input via Interactive Voice Response (IVR) systems. Combinations of these technologies may also be used.

It can be seen then, that the process of inserting value into pre-paid account using stored value cards is a multi-step process, requiring a user to properly identify the particular stored value card account, add value to this account, properly identify the particular pre-paid service the user wishes to fund, and then transfer value from the stored value card account to the user's pre-paid account. The numerous amounts of transactions are inefficient, and the necessity for user and/or retailer involvement in each of these steps increases the likelihood of errors in the process.

Accordingly, it is desirable to make purchase transactions for products and services more convenient, efficient, and timely.

Radio Frequency Identification (RFID) is known in wireless communication technologies. RFID technology generally comprises a tag and an interrogator, each located remote from each other. RFID tags may also be known as chips or transponders, and RFID interrogators may also be known as readers, transceivers, or decoders. Presently, there are generally three (3) main categories of tags characterized by their power source: passive, semi-passive and active. Passive tags do not have any internal power, and must absorb power from an outsides source in order to transmit data. Semi-passive tags and active tags have internal power sources. Semi-passive tags generally do not transmit their data until the tag is interrogated, while active tags (also known as beacons) may transmit data at periodic intervals.

In general, an RFID interrogator may emit an activation signal, which may be received by the RFID tag. Upon receiving the activation signal, the RFID tag may be activated and may emit data stored on the RFID tag to the RFID interrogator. The RFID interrogator may pass the received data to a host computer, and optionally may send additional information to be stored on the RFID tag.

RFID may reduce or eliminate the need for other data storage systems, such as magnetic stripes or bar codes, and thus reduce or eliminate the difficulties associated with reading such media. RFID may also reduce or eliminate the need for manual input and Interactive Voice Response (IVR) systems. RFID enabled devices are increasingly used at retail outlets to enhance existing payment/purchase processes.

Accordingly, incorporating RFID technology into systems and methods for purchasing products and services, particularly pre-paid products and services may be desirable.

SUMMARY OF THE INVENTION

Aspects of the invention include methods and systems for using a Radio Frequency Identification (RFID) payment card. The method generally comprises receiving an indicia identifying an RFID card, receiving a request to activate the RFID card, activating the RFID card by associating an initial value with a database record associated with the RFID card; receiving a PIN associated with the RFID card; receiving profile information; and associating the profile information with the database record. Systems for using RFID cards generally comprise an RFID card, an RFID account associated with the RFID card, a merchant communication module that receives indicia identifying the RFID card and sends a request to activate the RFID card, and a central processor or intermediary that receives a PIN associated with the RFID card and a request to activate the RFID card from the merchant communication module.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE INVENTION

Reference will now be made in detail to embodiments of the invention, examples of which are illustrated in the accompanying drawings.

As noted above, Radio Frequency Identification (RFID) allows wireless communication between an RFID tag and an RFID interrogator. An RFID tag generally comprises an antenna to receive energy and signals (and to transmit signals), a memory chip, a unique identifier, and optionally an internal power supply. The memory chip may have read/write capabilities, and may be controlled by an RFID interrogator. The RFID interrogator may generally be comprised of a transceiver for transmitting data to the tag, a receiver for receiving data from the tag, a power supply, and a decoder. The RFID interrogator may be associated with a host computer or a communications network.

An RFID tag may be quite small, and may be embedded in various items. Of particular relevance to the present invention is the ability to embed an RFID tag in a stored value card and/or in a wireless communication device. An RFID enabled stored value card may be used to purchase and/or pre-pay for a wide range of products and services, usually but not exclusively, in a retail environment. An RFID enabled wireless communication device may be used to simplify transactions between the wireless communication device and an interrogator, which may be located at a point of sale (POS) device. The RFID enable wireless communication device may therefore be used for a multitude of purposes, some of which are discussed in more detail below.

Each RFID tag embedded in a stored value card or wireless communication device may have its own unique identity, and may also contain the identity of the component into which it is embedded (e.g., the particular stored value card or particular wireless communication device). The identity of each RFID tag together with associated component information may be held in an associated record stored in a central database for later reference.

Additional user, product, and payment information may be progressively added to the central database record as the RFID enabled component is used. An RFID interrogator may be located at a POS, a dedicated kiosk, or other such retail environment, and may access this information.

Figure 1:
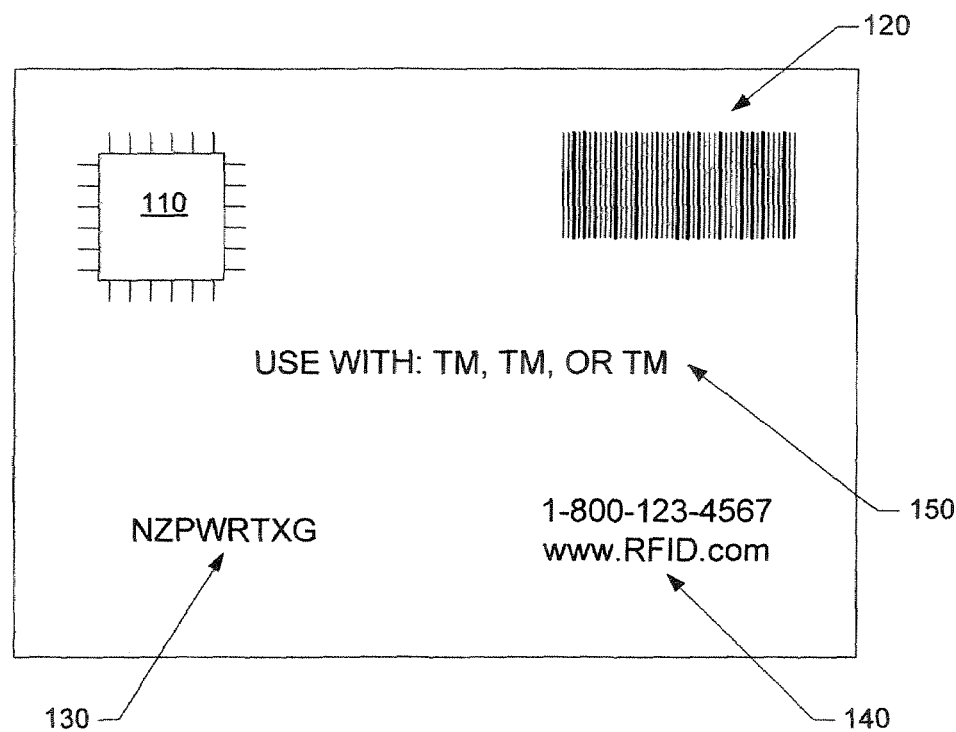
FIG. 1 is a schematic diagram of an RFID enabled stored value card in accordance with some embodiments of the present invention.

With reference to FIG. 1, an RFID enabled stored value card 100 in accordance with some embodiments of the present invention will now be discussed. The RFID enabled stored value card 100 may be of any physical shape and configuration, and also may comprise any type of material. In some embodiments of the invention, the RFID enabled stored value card 100 may be configured the same or similar to a standard credit or debit card, made of plastic and having the same or similar proportions and features. The RFID enabled stored value card 100 may also be card-like, but may have different proportions than a standard credit or debit card, e.g., a keychain card, a folding paper card, a metal card, and so forth. In addition, the RFID enabled stored value card 100 may be non-card-like, e.g., a key fob, miniature figure, and/or a communication device, etc.

The RFID enabled stored value card 100 may comprise an RFID tag 110, machine readable media 120, a personal identification number (PIN) 130, and an information access address 140. The RFID enabled stored value card 100 may optionally comprise other information 150. Each of these components is optional, and it is fully contemplated that the RFID enabled stored value card 100 may not include all of these components, or may further comprise additional components.

In some embodiments of the invention the RFID tag 110 may be a passive RFID tag, but it is also contemplated that the RFID tag 110 may be a semi-passive or active RFID tag. The machine readable media 120 may be in any format, such as but not limited to a magnetic stripe, a one-dimensional or two-dimensional bar code, a series of images or symbols, etc.

The PIN 130 may be initially concealed on the RFID enabled stored value card (e.g., under a scratch panel or other security barrier) or may be fully visible. The PIN may be comprised of numeric, alpha, or alpha-numeric characters. An Alpha PIN comprised of only alphabetic characters may be preferred over using a PIN with only numeric characters because the number of potential unique permutations is much greater. Additionally, a purely alphabetic PIN may be easy for a user to distinguish from a purely numeric PIN, and as such both PINs may be included for different purposes. A centralized database may hold a record of the identity of each RFID tag, the RFID enabled stored value card that the RFID tag is embedded in, and the associated PIN.

The information access address 140 may take any form that may direct a user to additional information. The information access address 140 may be in the form of a telephone number (e.g., a toll free number), a number to direct text messages (e.g., SMS communications) to, a particular internet address, an email address, and/or a physical postal address.

The RFID enabled stored value card may also comprise other information 150. The other information 150 may comprise, but is not limited to, instructions for first use and subsequent uses, particular branding (e.g., the names and/or trademarks of providers of goods or services at which the RFID enabled stored value card may be redeemed), first use value (e.g., the RFID enabled stored value card's initial denomination at purchase), required legal notices, and/or any other information that may be useful to a user or otherwise required.

Figure 2:
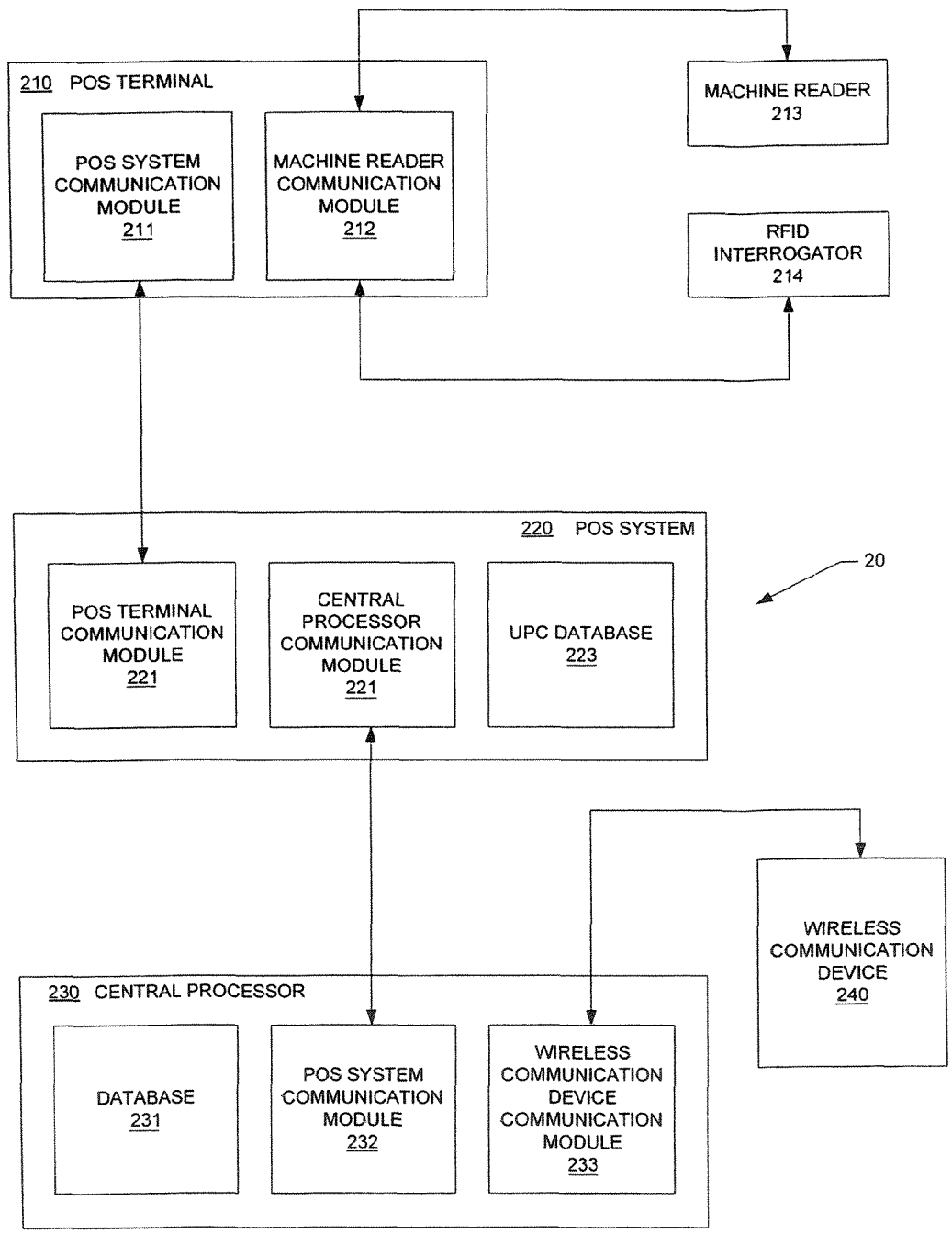
FIG. 2 is a schematic diagram of an RFID processing system in accordance with some embodiments of the present invention.

With reference to FIG. 2, a system 20 for using an RFID enabled stored value card 100 will now be discussed. The system 20 may be comprised of a point of sale (POS) terminal 210, a point of sale (POS) system 220, and a central processor 230. The system 20 may optionally further comprise a wireless communication device 240. The POS terminal 210 may comprise a POS system communication module 211, a machine reader communication module 212, a machine reader 213, and an RFID interrogator 214. The POS system communications module may provide communications between the POS terminal 210 and the POS system 220. The machine reader communication module 212 may provide for communication between the POS terminal (and via the POS system communication module 212, the POS system 220) and the machine reader 213 and the RFID interrogator 214. The machine reader 213 may comprise any reader capable of reading media, including but not limited to a magnetic stripe reader, a bar code (one-dimensional or two-dimensional) reader, an optical recognition device, etc. The RFID interrogator 214 may provide a means for determining if an RFID tag is present, and means for reading any information present on an RFID tag.

The POS system 220 may be generally comprised of a payment card system communication module 221, a POS terminal communication module 222, and a Universal Product Code (UPC) database 223. The payment card system communication module 221 may provide for communications between the POS system 220 and the central processor 230. The central processor 230 may be located in a location remote of the POS system 220. The UPC database 223 may reflect the various product codes for all products available from a particular merchant or retailer, group of merchants or retailers, or a consortium of merchants or retailers.

The central processor 230 may be located remote of the POS terminal 210 and the POS system 220, and may generally comprise a database 231, a POS system communication module 232, and a wireless communication device communication module 233. The database 231 may in turn comprise information associated with one or more RFID enabled stored value cards 100. The database 231 may include information such as the RFID enabled stored value card 100 PIN, activation numbers, identification numbers, and/or account information. The POS system communication module 232 may provide for communication between the central processor 230 and the POS system 220. The wireless communication device module 233 may provide for communication with the wireless communication device 240.

The wireless communication device 240 may be any wireless device that allows a user to communicate with a third party located at a remote area. The wireless communication device 240 may be, but is not limited to, a wireless telephone, SMS device, wireless email device, pager, personal digital assistant, etc.

Figure 3:
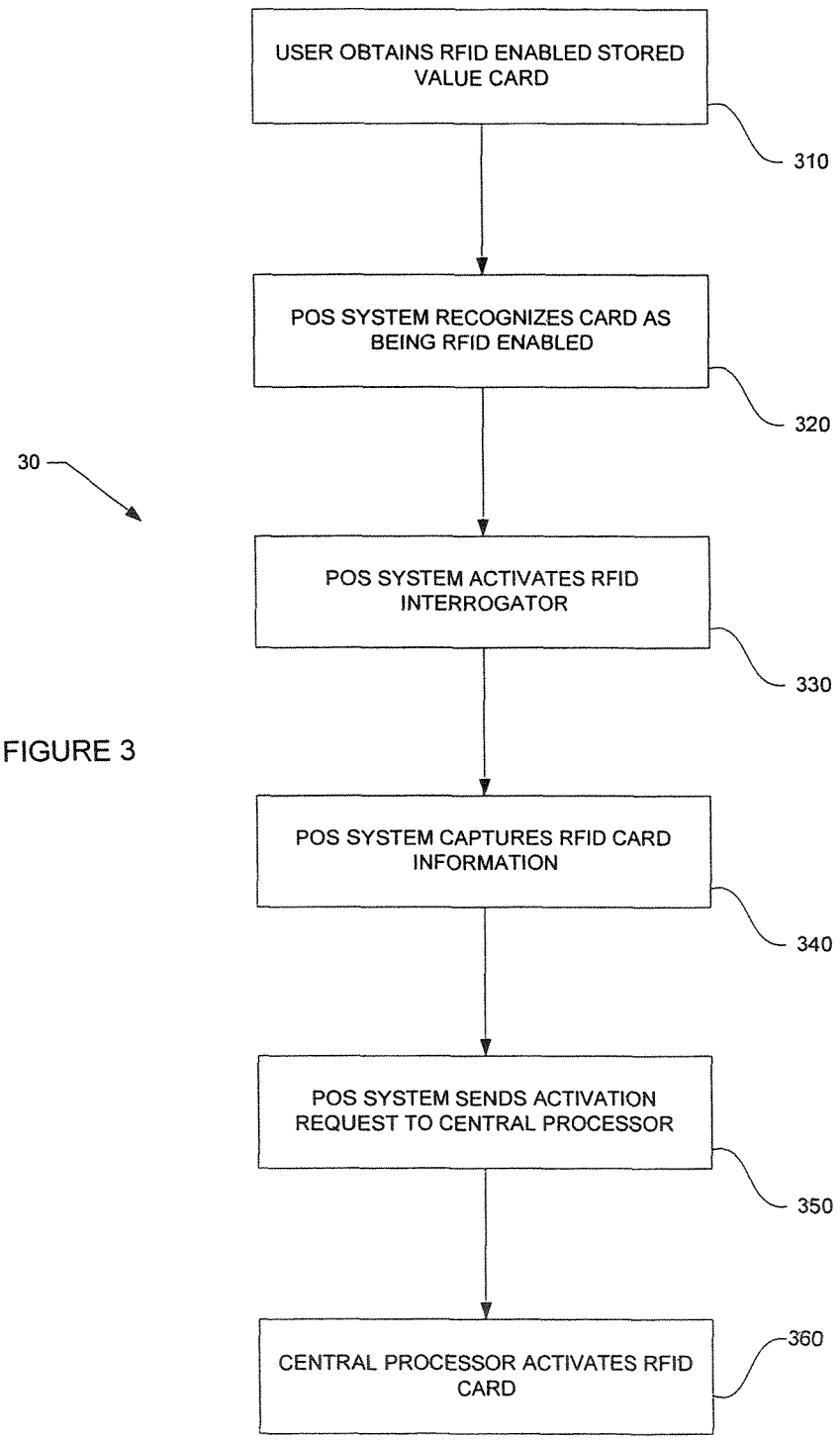
FIG. 3 is a flow diagram, illustrating activation of an RFID enabled stored value card in accordance with some embodiments of the present invention.

With reference to FIGS. 1, 2, and 3, a method 30 of activating of an RFID enabled stored value card 100 in accordance with some embodiments of the present invention will now be discussed. At step 310, a user may select an RFID enabled stored value card 100. The RFID enabled stored value card 100 may be the sole selection, or it may be included in a variety of other product or service selections that the user may make. The user may bring the RFID enabled stored value card 100, along with any other selected products or services, to a POS terminal 210 for purchase.

At step 320, the POS terminal 210 may recognize the stored value card as being RFID enabled. The POS terminal 210 may recognize this when the machine readable media 120 on the RFID enabled stored value card 100 is read by the machine reader 213 associated with the POS terminal 210. Alternatively, the POS terminal 210 may recognize the RFID capability if the RFID interrogator 214 is active and detects the RFID tag.

At step 330, after the POS terminal 210 recognizes the stored value card 100 as being RFID enabled, the POS terminal 210 may activate the RFID interrogator 214. If the RFID interrogator 214 was already active, this step may be omitted. The RFID interrogator 214 may activate the RFID tag 110 if the RFID tag 110 is passive or semi-active. At step 340 the RFID interrogator 214 may capture information recorded on the RFID tag 110. This information may include indicia identifying the specific RFID enabled stored value card 100 that has been purchased. The RFID interrogator 214 may convey this information to the machine reader communication module 212 of the POS terminal 210. The POS terminal 210 may in turn convey this information to the POS system 220 via the POS system communication module 211. At step 350 the POS system 220 may send a request to the central processor 230 via the payment card system communication module 221 to activate the particular RFID enabled stored value card 100 purchased.

At step 360 the central processor 230 may receive the activation request and may activate the particular RFID enabled stored value card 100 purchased. The activation of the RFID enabled stored value card may be accomplished by associating a value with an account that is associated with the particular RFID enabled stored value card 100. This value may be a fixed denomination for some RFID enabled stored value cards, or may be selectable by the user. Alternatively, the activation of the RFID enabled stored value card 100 may be accomplished by inserting, deleting, or modifying a flag in the database 231 of the central processor 230.

The RFID enabled stored value card 100 may now be active, and the user may pay for the RFID enabled stored value card 100 purchased. The RFID enabled stored value card 100 activation may be deferred until after verification that the user has successfully paid. Alternatively, the RFID enabled stored value card 100 may be initially activated, but then later deactivated if payment is not verified within a set time after the activation.

Figure 4:
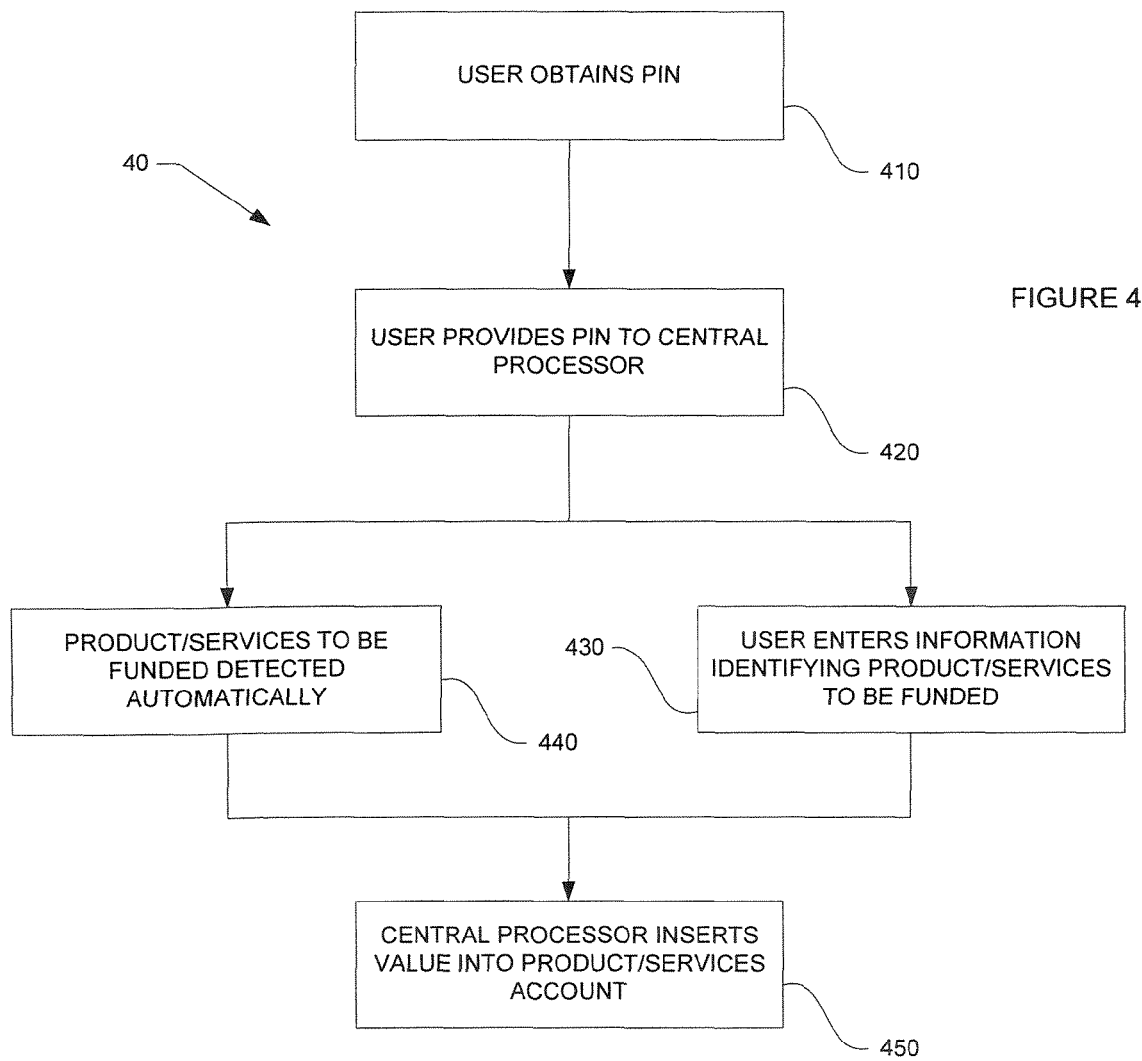
FIG. 4 is a flow diagram, illustrating a first use of an RFID enabled stored value card in accordance with some embodiments of the present invention.

With reference to FIGS. 1, 2, and 4, a first use of an RFID enabled stored value card 100 will now be discussed. At step 410, the user obtains the PIN 130 of the RFID enabled stored value card 100. As noted above, the PIN 130 may be printed under a scratch panel (e.g., a latex security barrier) or may be otherwise obscured from view prior to purchase. In order to obtain the PIN 130, the user may scratch the security panel off, or may otherwise view the PIN 130.

At step 420, the user may provide the PIN 130 and/or any other required identifying indicia to the central processor 230. The user may provide this information to the central processor 230 via a telephone call, text message (SMS), IVR, tone recognition, by stating it verbally to an operator, by accessing an internet webpage, etc. This step may be accomplished in any manner that provides for communication between the user and the central processor 230.

At step 430, the user may provide information regarding the account to which the user would like to add value from the RFID enabled stored value card 100. This information may include account numbers, telephone numbers, etc. This step may also be accomplished in any manner that provides for communication between the user and the central processor 230.

Optionally, at step 440, the central processor 230 may automatically detect the information regarding the account to which the user would like to add value from the RFID enabled stored value card 100. This may be accomplished automatically if the user contacts the central processor 230 using a wireless communication device 240, the service account of which is the desired target of the stored value. For example, mobile communication devices (e.g., wireless telephones, etc.) may contain an embedded electronic serial number (ESN) which may serve as a unique identifier. The ESN may be identified by the central processor 230 when the communication from the user is received. Further, the central processor 230 may trace or associate the ESN with a particular carrier and with a particular phone number in the database 231.

The central processor 230 may associate a carrier, a particular wireless communication number (e.g., telephone number), and/or a user's carrier account number with the detected ESN. Accordingly, when the stored value on an RFID enabled stored value card 100 is intended to be provided to the provider of the telecommunications service of the user's wireless communications device 240 that contacts the central processor 230, the ESN and the RFID enabled stored value card PIN 130 may supply sufficient information to complete the transaction. Under some circumstances the user may only need to provide a PIN 130, and other necessary information (user identity, mobile telephone service provider, value amount) may be obtained by other means.

Similarly, a user may send an email containing the card PIN 130 to the central processor or intermediary internet address. All other data necessary to complete a purchase of internet services may be associated automatically, and a purchase of internet services may be completed.

At step 450, the central processor 230 may provide value from an account associated with the RFID enabled stored value card 100 to the user's account to which the user would like to add value (e.g., prepaid wireless telephone account).

Figure 5:
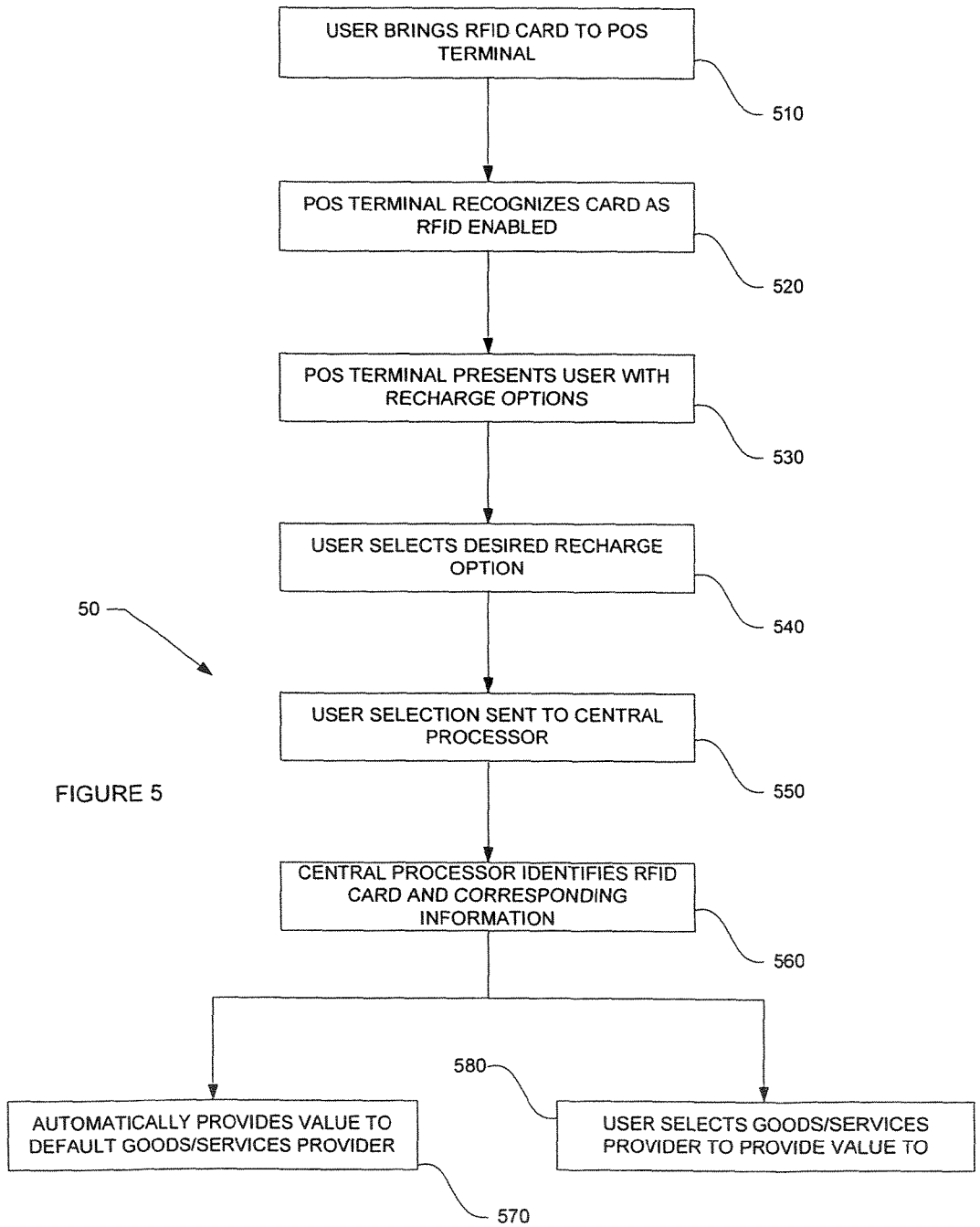
FIG. 5 is a flow diagram, illustrating subsequent uses of an RFID enabled stored value card in accordance with some embodiments of the present invention.

With reference to FIGS. 1, 2, and 5, a method 50 for subsequent uses of an RFID enabled stored value card 100 in accordance with some embodiments of the present invention will now be discussed. At step 510 a user may bring an RFID enabled stored value card 100 to a retail or merchant in order to "top off," reload, or recharge, value on the card. At step 520, the POS terminal 210 may recognize the stored value card 100 as RFID enabled. This recognition may be the result of the RFID interrogator 214 detecting the RFID capability of the stored value card 100, or by the machine reader 213 conveying a product code to the POS terminal 210 and POS system 220 (via the POS system communication module 211) which the POS system 220 detects as an RFID enabled product, and turning on the RFID interrogator 214.

At step 530, the POS system 220 may communicate with the central processor 230 and convey top off options to the POS terminal 210. The merchant or retailer may then inform the user of the top off options available for the specific RFID enabled stored value card 100.

At step 540, the user may select the desired recharge option. At step 550 the user's selection may be conveyed to the central processor 230.

At step 560 the central processor 230 may credit the value selected by the user to the same user identity and/or RFID card account that was associated with the RFID enabled stored value card 100 in a previous transaction. If selected by the user, at optional step 570, the central processor 230 may automatically provide the amount of value selected directly to the user's account that was previously used.

If the user does not select automatic funding as in step 570, then at step 580 the user may provide information regarding the account to which the user would like to add value from the RFID enabled stored value card 100. This information may include account numbers, telephone numbers, etc. This step may also be accomplished in any manner that provides for communication between the user and the central processor 230.

Figure 6:
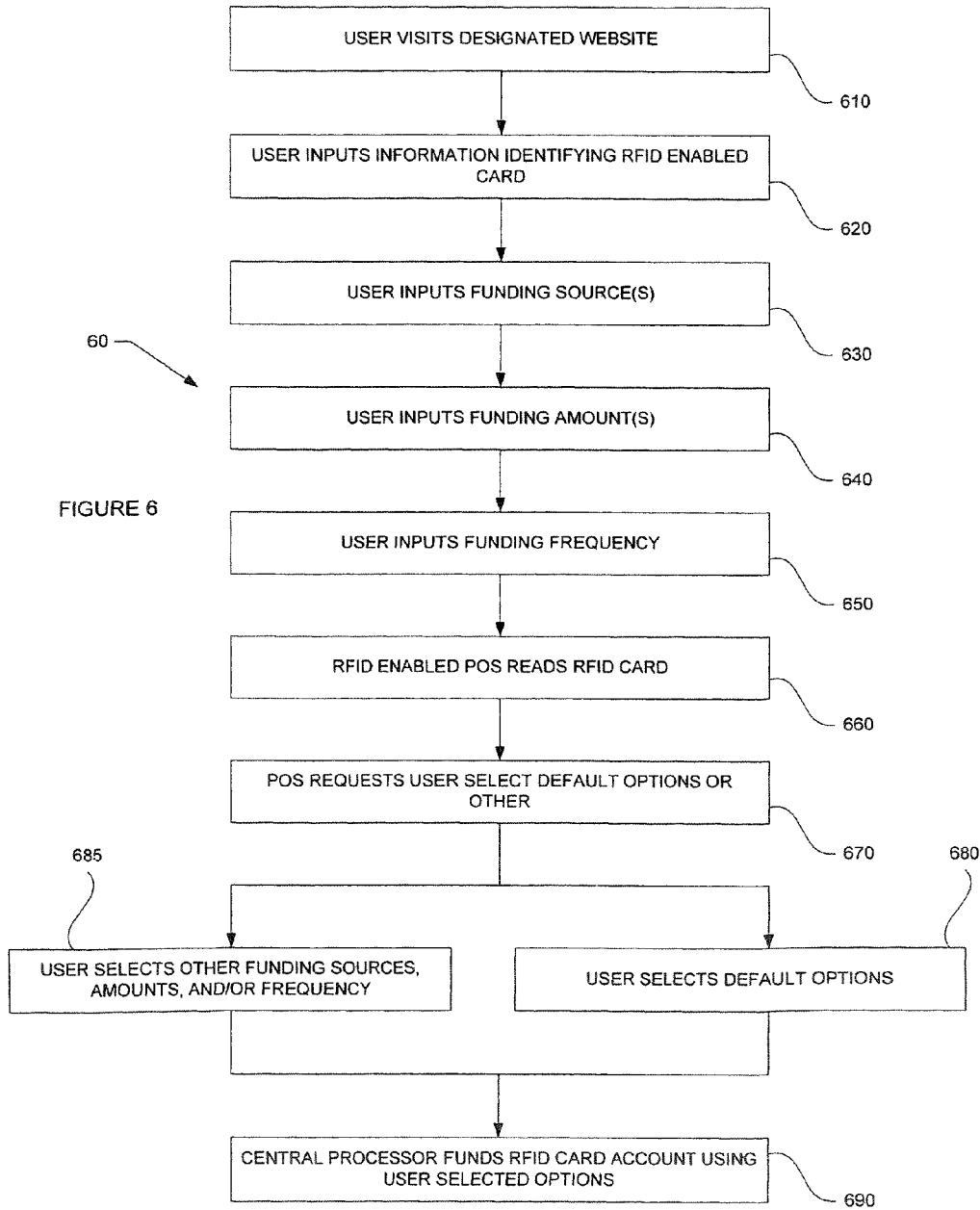
FIG. 6 is a flow diagram, illustrating a system for managing RFID enabled stored value cards and/or RFID enabled wireless communication devices in accordance with some embodiments of the present invention.

With reference to FIGS. 1, 2, and 6, methods of alternative payment options for RFID enabled stored value cards in accordance with some embodiments of the present invention will now be discussed. In some embodiments in accordance with the present invention, after an RFID enabled stored value card 100 is purchased, a website may be used to create a user profile. At step 610, the user may visit the particular website used to manage the user's RFID enabled stored value card account. During the user's first visit to the website, the user may enter RFID identifying indicia, and designated provider information (such as the user's phone number, and carrier) into the user's profile.

At step 630, the user may provide information regarding various payment sources for the RFID enabled stored value card 100. Without limitation, these sources may include credit card accounts, debit card numbers, bank account information (checking, savings, money market, investment, etc.) and any other financial source. At step 630 the user may select a default funding source. For example, the user may select to fund the RFID enabled stored value card 100 with electronic withdrawals from his or her checking account.

At step 640 the user may select a default payment or funding amount. For example, the user may select a default payment amount of $50.

At step 650, the user may select a default payment frequency. The user may select to have the RFID enabled stored value card 100 automatically funded on a periodic (e.g., monthly) basis, or may select to only fund the RFID enabled stored value card 100 upon later user interaction. For example, the user may select to have $50 withdrawn from his or her checking account and added to the RFID enabled stored value card 100 monthly, or may set the system up with default values, but require additional user interaction before any actual funding is accomplished.

At step 660 the user may have the RFID enabled stored value card 100 read by an RFID interrogator. The RFID interrogator may be a component of a POS terminal, or may be a component of a stand-alone kiosk that may be dedicated (single purpose), such as an airline check-in kiosk, or may be multi-purpose like an automated teller machine (ATM). The RFID interrogator may read the information on the RFID enabled stored value card 100, and access the saved profile established by the user during their internet session described above in steps 610-650.

At step 670, the POS terminal or kiosk may request that the user select their default (e.g., predetermined) options, or select a different funding source, amount, and frequency. Should the user select their default selections, at step 680 the POS terminal or kiosk may communicate such selection to the central processor which may make the appropriate withdrawal and funding. If the user selected to have the funds automatically inserted into a particular account (e.g., a wireless airtime account), the central processor may automatically deposit the withdrawn funds (minus any applicable services fees) into the user's account.

If the user did not select the default selections, then at step 685 the user may select the funding source, amount, and/or frequency as desired.

At step 690, the central processor may fund the RFID enabled stored value card 100 according to the user selections at steps 680 or 685. If the user selected to automatically provide payment from the RFID enabled stored value card 100 to the selected user account (e.g., wireless airtime account), the central processor may make such payment at step 690 as well.

It is important to note that any interactions between the user and the POS terminal (or merchant, clerk, etc.) may be dependent upon the user's selections. In other words, if the user selected to use the default funding options (e.g., a checking account), no funds related to the RFID stored value card funding would be exchanged between the user and the POS terminal (or merchant, clerk, etc.). If the user selected a funding option of cash, or a credit card not of record, then the user would provide such cash or credit card to the POS terminal (or merchant, clerk, etc.).

As noted above, none, some, or all of the steps above may be accomplished through the use of a kiosk, or other user operated terminal. A kiosk may be equipped with an RFID interrogator, and may provide the user with the payment options discussed above, and/or the ability for the user to modify their default selections. For example, a kiosk may confirm the transaction, and may also present the user with a request to approve the default selections or to make different selections. For example, a single "key" on an interactive touch screen may allow the user to select: a) the default provider and associated user account number, b) the default amount, and c) the default payment source.

RFID enabled stored value cards may also be used for numerous other purposes. For example, an RFID enabled product (such as a stored value card) may not need to be read by a traditional machine reader (e.g., bar code reader, magnetic stripe reader, etc.). Instead, the embedded RFID tag may be read at a distance, resulting in more convenient purchases. For example, a purchaser of such an RFID enabled product (such as a stored value card) may not need to take the product out of their shopping cart, but may simply place the product in communication with an RFID interrogator.

In accordance with some embodiments of the present invention, an RFID enabled stored value card may be used as a generic payment card. As discussed above, the RFID enabled stored value card may have an amount of value associated with it (e.g., in an account associated with the RFID enabled stored value card). These funds may be used by the user for general purchases. The user may purchase goods or services, and allow an RFID interrogator (e.g., at a POS terminal) to read the RFID tag in the RFID enabled stored value card. The POS may send data obtained from the RFID tag and information regarding the purchase transaction to a central processor with a payment request. The central processor may debit the account associated with the RFID enabled stored value card, or may debit the funding source for the RFID enabled stored value card (e.g., the user's checking account or credit card). The central processor may return to the POS terminal a communication indicating whether or not the payment transaction was successful (e.g., an "OK" or "NOK" response).

In accordance with some embodiments of the present invention, an RFID enabled stored value card may be used to provide payment to multiple accounts. As discussed above, a website may be used to create a user profile. The user may visit the particular website used to manage the user's RFID enabled stored value card account, and may enter RFID identifying indicia, funding information (source, amount, and/or frequency) and multiple designated provider information. The provider information may include information sufficient to identify the user's account with each provider (e.g., the user's phone number for a wireless provider, the user's account number for a digital cable provider, etc.). The accounts may be prioritized, so that the top priority account is presumed unless other accounts are expressly selected. For example, the top priority account may be presented first in a scroll type selection menu during interaction with the user.

The user may then present the RFID enabled stored value card at a POS terminal or equivalent (e.g., kiosk, ATM machine, etc.). The POS may utilize an RFID interrogator to read the RFID enabled stored value card, and may then access the user's list of preferred accounts from the registration profile associated with the RFID enabled stored value card. This list may be presented to the user visually on a screen. The user may select a default account and a default value, or the user may select a non-default account and a non-default value. This selection may be made verbally to a merchant or clerk, or may be made electronically (e.g., using a touch screen).

A list of payment options from the registration profile may be presented to the user, including any credit card, debit card, gift card, or any commercial payment vehicles that the POS may accept. The user may select a default payment option, or a non-default payment option. The user may then authorize the selected payment to the selected account. The POS terminal may communicate with the central processor such selection. The central processor may provide payment to the selected account, deducting such funds from the account associated with the RFID enabled stored value card and selected by the user. Alternatively, the user may provide cash to the POS terminal, which in turn instructs the central processor to make the selected payment. In such a situation, later settlement may occur between the POS terminal (or merchant) and the central processor.

In some embodiments, a wireless communication device (e.g., a wireless telephone) may include an RFID tag. The RFID tag may be an active tag, serving as a beacon and regularly broadcasting information, or may be semi-passive, emitting information only upon receiving a request to do so. The RFID tag may emit information comprising a tag ID, an ESN, and/or the wireless communication device's access number (e.g., telephone number). A POS terminal may receive this information from the wireless communication device's RFID tag and may perform actions based upon this information.

For example, a user may request to provide a specified amount of value to the provider or carrier of the wireless communication device. The retailer may initiate the transaction using an RFID enabled POS terminal. The POS terminal may communicate with the RFID enabled wireless communication device, thereby obtaining the necessary information (e.g., provider, account number, etc.). The user may provide payment to the POS terminal, which in turn, may provide value to the wireless communication device's provider or carrier. The user may authorize the transaction by making a selection on the wireless communication device (e.g., press the "#" key to approve).

A retailer receiving information from a user's RFID enabled wireless communication device may also interact with the user regarding the wireless communication device. For example, a retailer may offer to sell additional airtime or other services to the user. Such an offer may be displayed on a screen of the POS terminal or on the RFID enabled wireless communication device itself. The user may accept or decline the offer through interactions with the POS terminal, or with the RFID enabled wireless communication device.

Alternatively, the retailer may perform more complex transactions after receiving information from an RFID on a mobile telephone. For example, the retailer may determine the amount of minutes left in a user's mobile telephone account and use that information to interact with the user. For example, the retailer may ask, "You have only 15 minutes remaining in your account, would you like to purchase 500 additional minutes for $10?" If the user agrees, then the user may perform this sale simultaneously with the sale of any other additional products from the retailer during the check out procedure at the POS.

A user of an RFID enabled wireless communication device may also use a website to create a user profile. The user may visit the particular website used to manage the user's RFID enabled wireless communication device. During the user's first visit to the website, the user may enter RFID identifying indicia, and designated provider information (such as the user's phone number, and carrier) into the user's profile. The user may also provide information regarding various payment sources. Without limitation, these sources may include credit card accounts, debit card numbers, bank account information (checking, savings, money market, investment, etc.) and any other financial source. The user may select a default funding source.

In later purchase transactions, the user may utilize the RFID enabled wireless communication device to provide payment for goods or services from the associated payment sources. In other words, a user may select various items from a retailer or merchant for purchase. The user may bring the items to an RFID enabled POS terminal, where they are totaled. The RFID enabled POS terminal may interact with the user's RFID enabled wireless communication device. The user may select (either verbally to the merchant, or through electronic selection on the RFID enabled POS terminal, and/or the RFID enabled wireless communication device) the payment source for the purchased goods. Upon selection, the RFID enabled POS terminal may communicate with the RFID enabled wireless communication device to obtain the necessary payment information. The POS terminal may then either withdraw funds from the payment source directly, or from an intermediary account that may be replenished by the funding sources.

In this manner, a user may also use an RFID enabled wireless communication device with internet capabilities to make purchases over the internet. The user would select the goods or services he or she wishes to purchase, and then select the funding source via the RFID enabled wireless communication device. It is also contemplated that in addition to goods and services, a user may use an RFID enabled wireless communication device to provide payment to an RFID enabled gasoline pump for expedited pay-at-the-pump transactions.

Although some embodiments in accordance with the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. For example, although the above discussion surrounds a single stored value account that may relate to airtime or prepaid wireless phones, it is contemplated that the above disclosed systems may be used to transfer any sort of stored value. It is further contemplated that an RFID enabled telephone as disclosed above may be used as a tool to manage the RFID transfer of stored value into multiple accounts. Additionally, using technology known in the art that allows wireless telephones to access the internet, it is contemplated that a user may use an RFID enabled telephone to transfer value from an account (or a merchant, etc.) to a stored value account accessible by the RFID enabled telephone for use in online purchases. Such value may also be used in typical "brick-and-mortar" purchases as well (e.g., merchant terminals, gasoline dispensing pumps, etc.). The uses of an RFID enabled phone with access to one or more stored value accounts are numerous, and the discussion above and the claims below should not be read to foreclose any of these uses.

In some embodiments, a user's RFID card may facilitate interactions that are customized based upon information associated with the RFID card. By accessing information associated with the user's RFID enabled stored value card or RFID enabled wireless communication device, a retailer may provide customized information and/or advertisements to the user. For example, a user with a recorded history of regularly buying a particular product may be enticed to additionally buy a second product at a particular discount. The user may also be reminded or further enticed to purchase accompanying or complimentary products. Alternatively, the user may be rewarded for loyalty, for example by automatically discounting every $N^{th}$ product by a certain percentage.

Communications to the user may be delivered privately by printing coupons at a check-in kiosk, or may be delivered semi-privately by a small display mounted on a grocery cart. The grocery cart may comprise an RFID reader, and may communicate with the user and the user's RFID enabled stored value card and/or RFID enabled wireless communication device. By established a network of RFID interrogators, the user's location in a particular retail establishment may be determined, and information and/or advertisements contoured accordingly. For example, user may receive targeted advertisements such as "Brand X paper towels in aisle 7 are 20% off" or "turn left at the next aisle to get napkins for the large pepperoni pizza." Optionally, the user may have a default shopping list which may be displayed on the grocery cart or on the user's RFID enabled wireless communication device.

In addition to historical data associated with the RFID card, the retailer and/or central processor may track the user's progress through the store by tracking the RFID card, and may apply a predictive algorithm or an expert system to all available information. For example, if the user passed through pizza area, and then paused for 30 seconds in front of the napkin area, then the retailer may infer that the user is trying to decide which napkin to buy, and the retailer may suggest "Brand X napkins are on sale today," or similar.

To summarize, a user's RFID enabled stored value card or RFID enabled wireless communication device may have substantial historical information associated with it. This information may be used to interact with the user during goods and/or service selection and purchase transactions.

It will be apparent to those skilled in the art that various modifications and variations can be made in the method, manufacture, configuration, and/or use of the present invention without departing from the scope or spirit of the invention. Accordingly, the claims set forth below should be construed in view of the full breadth and spirit of the embodiments of the present inventions as disclosed herein. For example, any set of steps in a process may be reordered, individual steps may be deleted, and other related steps may be inserted. Further, some of the embodiments may be practiced using identifications systems other than RFID. Some of the embodiments may be practiced by one or more of: a provider of goods, a provider of services, and/or a central processor.

The invention claimed is:

1. A method of adding value into an account of a user with a provider of goods or services, the method facilitated by a radio frequency identification (RFID) enabled device and an RFID enabled point-of-sale (POS), the method comprising:

a. the POS receiving a request via RFID communications to add a value amount the account associated with the device;
b. the POS interrogating the device and determining account identification information of the account associated with the device;
c. the POS sending the account identification information and the value amount to a central processor;
d. receiving at the POS confirmation from the central processor that the value amount was added into the account associated with the device.

2. The method of claim 1, wherein the value is in the form of a stored value card.

3. The method of claim 1, wherein the account associated with the device is redeemable for services, the services selected from the group consisting of wireless telephone services, gaming services, media download services, music services, internet-enabled communication services, wireless web access, emergency road services, legal services, accounting services, tax services, transportation services, online dating services, internet access, and film processing.

4. The method claim 1, wherein the account associated with the mobile telecommunications device is redeemable for gifts, gasoline, groceries, entertainment, movies, ringtones, games, graphics, music, or customer rewards.

5. The method of claim 1, wherein the account identification information comprises information sufficient to identify the provider and a specific account with the provider.

6. The method of claim 1, wherein the central processor identifies the provider based on the information received from the POS.

7. A method of adding value into an account of a user with a specific provider of goods or services, the value being redeemable with one or more providers, including the specific provider, the account having an associated account number, the method facilitated by a radio frequency identification (RFID) enabled device and a point-of-sale (POS), the device comprising an RFID tag and being associated with the account and the POS being RFID enabled, the method comprising:
a. receiving at a central processor from the POS a redemption request requesting that a value amount be added to the account, the redemption request being received from the device by the POS through RFID communications and comprising:
   i. the value amount selected by the user of the device; and
   ii. information identifying the device;
b. determining at the central processor the specific provider and the account number based on information identifying the device received in the redemption request;
c. causing by the central processor the value amount to be added into the account.

8. The method of claim 7, wherein the value selected is in the form of a stored value card.

9. The method of claim 7, wherein the account associated with the device is redeemable for services, the services selected from the group consisting of wireless telephone services, gaming services, media download services, music services, internet-enabled communication services, wireless web access, emergency road services, legal services, accounting services, tax services, transportation services, online dating services, internet access, and film processing.

10. The method of claim 7, wherein the account associated with the mobile telecommunications device is redeemable for gifts, gasoline, groceries, entertainment, movies, ringtones, games, graphics, music, or customer rewards.

11. The method of claim 7, wherein the information identifying the device comprises information sufficient to identify the provider and a specific account with the provider associated with the device.

12. The method of claim 7, wherein the central processor determines the account number based on the determined provider and the information identifying the device.

13. A method of adding value into an account of a user with a provider of goods or services, the method facilitated by a radio frequency identification (RFID) enabled device and an RFID enabled point-of-sale (POS), the method comprising:
a. receiving at the device a communication from a local network, the local network determining that the device is RFID enabled and obtaining from the device identifying information via RFID, the communication from the local network presenting a user of the device an opportunity to obtain goods or services;
b. sending a communication from the device accepting or declining the opportunity to obtain the goods or services;
c. upon acceptance of the opportunity to obtain the goods or services, receiving at the device a confirmation.

14. The method of claim 13, wherein the communication from the local network is an RFID communication.

15. The method of claim 13, further comprising:
a. the local network sending the device identifying information to a central processor;
b. the central processor sending to the device the opportunity to obtain the goods or services.

16. The method of claim 15, wherein the opportunity to obtain goods or services sent to the device from the central processor is an SMS message.

17. The method of claim 13, wherein the communication sent from the device accepting or declining the opportunity to obtain the goods or services is in the form of an SMS message.

18. The method of claim 15, wherein the communication sent from the device accepting or declining the opportunity to obtain the goods or services is sent to the central processor.

19. The method of claim 13, wherein the goods or services obtained are purchased by a user of the device.

20. The method of claim 19, further comprising:
a. upon acceptance of the opportunity to obtain the goods or service, selecting a source from which to transfer value to purchase the goods or services;
b. confirming the value source.

21. The method of claim 20, wherein the device is associated with various value accounts prior to the purchase of the goods or services.

22. The method of claim 21, wherein the source from which to transfer value to purchase the goods or services is selected from the list consisting of: credit card accounts, debit card accounts, bank accounts, checking accounts, savings accounts, money market accounts, and investment accounts.

23. The method of claim 21, wherein a selection of the source from which to transfer value to purchase goods or services is conveyed to the central processor via an SMS message.

24. The method of claim 20, wherein the device is associated with a value account during the purchase transaction.

25. The method of claim 24, wherein the device is associate with a value account via an SMS message to the central processor, the SMS message comprising information sufficient to identify the value account.

26. The method of claim 13, wherein obtaining goods or services is the funding of an account redeemable for services, the services selected from the group consisting of wireless telephone services, gaming services, media download services, music services, internet-enabled communication services, wireless web access, emergency road services, legal services, accounting services, tax services, transportation services, online dating services, internet access, and film processing.

27. The method of claim 13, wherein the goods or services are selected from the group consisting of redeemable for gifts, gasoline, groceries, entertainment, movies, ring-tones, games, graphics, music, or customer rewards.

* * * * *

UNITED STATES PATENT AND TRADEMARK OFFICE
CERTIFICATE OF CORRECTION

| | | |
|---|---|---|
| PATENT NO. | : 8,474,694 B2 | Page 1 of 1 |
| APPLICATION NO. | : 12/417317 | |
| DATED | : July 2, 2013 | |
| INVENTOR(S) | : Phil M Chakiris, Merrill Brooks Smith and Leslie G Lowin | |

It is certified that error appears in the above-identified patent and that said Letters Patent is hereby corrected as shown below:

In the Specifications:

In Background of the Invention, Column 1, Line 50 the word "provides" should be changed to --provide--

In Background of the Invention, Column 2, Line 23 the word "outsides" should be changed to --outside--

In the Claims:

Column 13, Line 2 reading "to add a value amount the account" should be changed to --to add a value amount to the account,--

Signed and Sealed this
Sixth Day of August, 2013

Teresa Stanek Rea
*Acting Director of the United States Patent and Trademark Office*